PHOTOGRAPHIC REPRODUCTION PROCESS

Filed March 16, 1953

Henry C. Yutzy
Burt H. Carroll
INVENTORS
BY Daniel I. Mayne
W. H. McDowell
ATTORNEY & AGENT 2,747,999
Patented May 29, 1956

2,747,999

PHOTOGRAPHIC REPRODUCTION PROCESS

Henry C. Yutzy and Burt H. Carroll, Rochester, N. Y., assignors to Eastman Kodak Company, Rochester, N. Y., a corporation of New Jersey Application March 16, 1953, Serial No. 342,375

3 Claims. (Cl. 95—88)

Figures 1, 2, 3, 4:
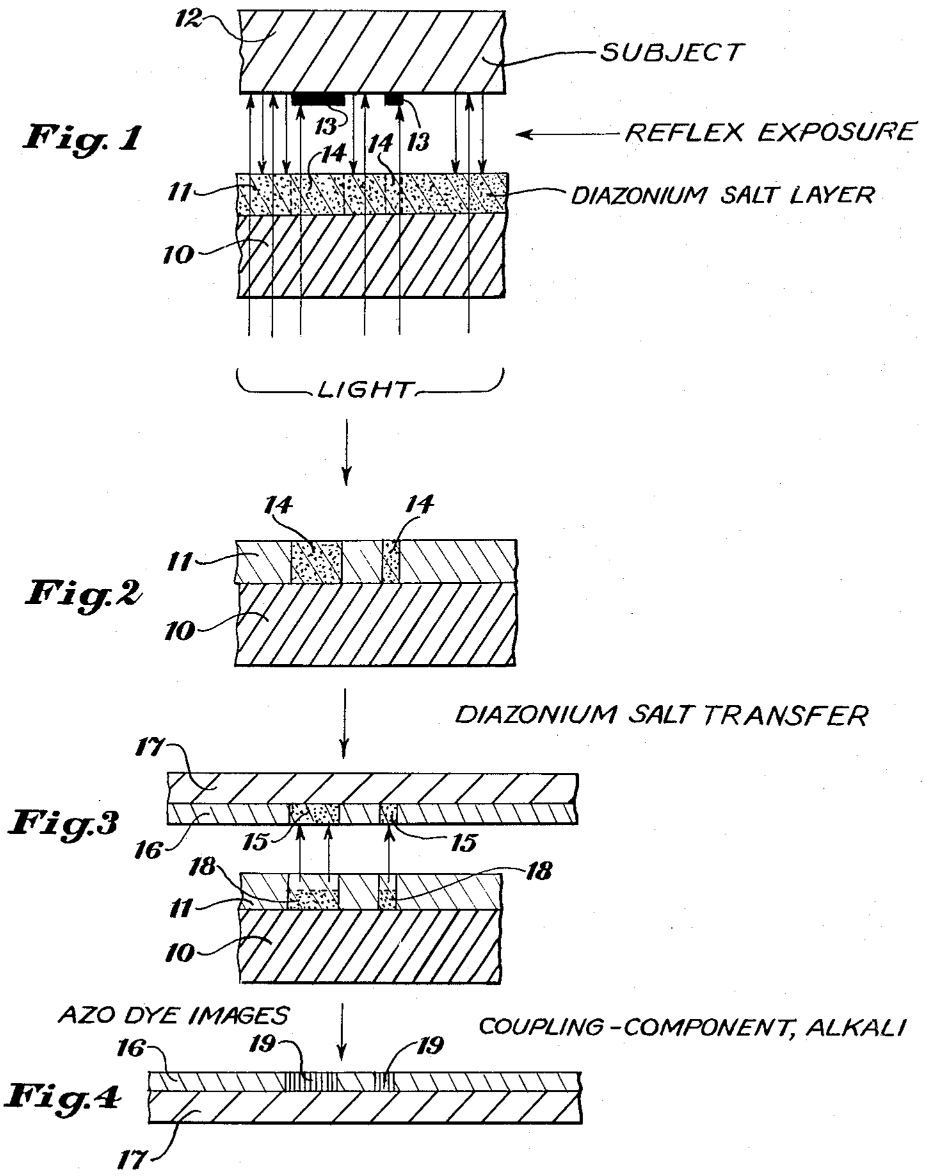

This invention relates to a diazo photographic reproduction process particularly adapted to producing a multiplicity of copies from a single exposed photographic element.

In general, our process includes exposing a layer of a diffusible diazonium salt to a suitable subject such as a line, halftone, or continuous tone positive, for a time sufficient to decompose the diazonium salt in the exposed region, followed by pressing the exposed layer into intimate contact with a moist receiving sheet to transfer a portion of the undecomposed diazonium salt by imbibition imagewise to the receiving sheet. The elements are then separated and in the presence of alkali and a coupling component for the diazonium salt, hereinafter referred to as an "azo dye coupling component" or a "coupling component," an azo dye image is formed on the receiving sheet in the region of the transferred diazonium salt as will be apparent from the following detailed description of our invention.

The conventional diazo printing process involves exposure of a layer of a diazonium salt which may contain a coupling component, with the result that decomposition of the diazonium salt takes place in the exposed region. When the exposed element is then treated with alkali, in the presence of a coupling component, a dye image is formed by reaction of the residual diazonium salt and the coupling component in the presence of the alkali. Accordingly, in making more than one copy of the subject, such as a machine drawing, the process must be repeated. In the process of our invention, after making an initial reproduction by transferring a portion of the image, a subsequent reproduction is conveniently made by merely making a second transfer of the residual diazonium salt in the exposed element, to a new receiving sheet and reacting the transferred diazonium salt image with a coupling component in the presence of alkali. Numerous copies of the subject can be prepared by repeating the transfer process. Of course, the number of copies obtained depends somewhat upon the quantity of diazonium salt present in the exposed element and generally this is greater than that used in conventional diazotype materials.

A further distinct advantage of our process lies in its adaptability to reflex copy methods as well as to other contact printing methods, to yield correctly oriented reproductions directly. In the usual diazotype process, reflex printing results in copies which are mirror images of the original, thus it is necessary to make a copy of the mirror image copy to obtain correct orientation.

One object of our invention, therefore, is to provide a process for obtaining a multiplicity of copies of a line, halftone or continuous subject by using a single exposure to the subject. A further object is to provide light-sensitive elements and procedures which may be employed to produce the copies. Other objects will become apparent from consideration of the following description of our invention:

The accompanying drawings show in greatly enlarged cross-sectional view the appearance of representative elements used in our invention at various stages in a process for producing copies of subjects according to our invention.

In general, the objects of our invention are accomplished by exposing to an illuminated subject, such as a typewritten letter or other line positive, a layer of a diazonium salt, until the salt is substantially all decomposed in the exposed region. The preferred subjects are two-tone subjects, including line and halftone subjects, and the diazonium salt is preferably contained in a hydrophilic organic colloid layer such as normally hardened gelatin. The exposed layer is then pressed, as by squeegeeing, into intimate contact with a hydrophilic receiving surface such as a gelatin layer in the presence of moisture to transfer a portion of the undecomposed diazonium salt imagewise to the hydrophilic surface. The elements are then sepaarted and if both the azo dye coupling component (preferably a substantially non-diffusing coupling component) and alkali have been incorporated into the hydrophilic receiving surface, the diazonium salt which has been transferred immediately reacts with the coupling component to form an azo dye image. Otherwise if the receiving surface contains no coupler or alkali, formation of the dye image is effected subsequent to separation of the elements by treatment with a solution of the coupler and alkali. In a variation of the process, both the diffusible diazonium salt and a diffusible coupler may have originally been present in the exposed hydrophilic layer and the mixture of undecomposed diazonium salt and coupler which has transferred to the receiving surface, can be caused to form a dye image by merely treating it with alkali.

In a preferred embodiment of our invention the diazonium salt is dispersed in a layer of a normally hardened hydrophilic organic colloid material in order to prevent any organic colloid material from adhering to the receiving surface during the transfer operation and being detached from the exposed element after the elements have been separated. For this purpose, the hydrophilic organic colloid material should be as hard as a layer of gelatin containing 0.7 gram of dry formaldehyde per pound of gelatin freshly coated. However, it is not necessary to disperse the diazo salt in a separate layer of a hydrophilic material on a support, since useful results are obtained when the salt is merely coated from solution onto the surface of a support such as ordinary photographic paper base.

The diazonium salt image in the exposed element can be transferred to the usual hydrophilic surfaces such as wood, paper, casein, gelatin, hydrophilic resin layers such as polyvinyl alcohol, etc. In case the surface of the receiving layer, such as gelatin, tends to be sticky, it may be hardened to the extent above mentioned by conventional methods. Methods well known in the art can be utilized for preparing such surfaces.

After making one copy of the subject as described, other copies are made merely by repeating the transfer of the diazonium compound from the exposed element to subsequent receiving elements. For this purpose, the diazonium salt may be transferred to receiving elements which may or may not contain coupling components. If a coupling component is present, it is preferred that it be non-diffusing so that none of it transfers to the element containing the diazonium salt. If no coupling component is present in the receiving elements, the image is developed after transfer by treatment with a solution of a coupling component and alkali.

Our invention can be more readily understood by consideration of the following examples in reference to the accompanying drawings.

*Example 1*

A sheet of gelatin-coated paper was surface-coated with a 0.6% solution of the diazonium chloride of 3-methyl-4-(N, N-diethylamino) aniline in 9% gelatin containing gelatin hardener, dried and exposed through a printed original to radiation from a mercury arc. After exposure, a similar piece of gelatin-coated paper was moistened with ammonia solution and pressed into contact with the first for 4 seconds. The second piece of paper was then swabbed with an ammoniacal solution of phloroglucinol, developing a positive image in a brown dye. Another piece of gelatin-coated paper was then moistened and brought into contact with the paper containing the diazonium salt and removed after about 5 seconds, followed by swabbing with the solution of phloroglucinol. Copies of the original positive were obtained.

The process was also carried out using reflex exposure methods as illustrated in the accompanying drawings wherein in Fig. 1 is shown the element having the semi-transparent paper support 10 carrying the gelatin layer 11 containing the diazonium salt, being exposed by reflex methods to the subject including a support 12 carrying printed images 13. Exposure decomposes the diazonium salt in layer 11 in regions other than 14 of the sensitive element, thus producing an element appearing substantially as shown in Fig. 2 having in layer 11 the diazonium salt images 14. Fig. 3 shows a portion of the diazonium salt images 15 being transferred by imbibition from the Fig. 2 element in the presence of moisture to the gelatin surface 16 of the receiving sheet having support 17. A residual diazonium salt image 18 remains in the sensitive element for later use in preparing subsequent copies. The transferred diazonium salt images 15 of Fig. 3 are then treated with the alkaline solution of phloroglucinol or other coupling component to obtain brown azo dye images 19 in the receiving element as shown in Fig. 4. Subsequent copies prepared from the sensitive element shown in Fig.3 in the manner described, appear substantially as shown in Fig. 4.

In both of these processes when the transfer operations were repeated using a second receiving sheet and a portion of the residual undecomposed diazonium salt was transferred thereto, coupling of the diazonium salt image with a coupling component on the receiving sheet again produced a well defined azo dye image.

*Example 2*

Paper was coated with a solution of the diazonium chloride of 4-(N-ethyl-N-ethoxyethylamino) aniline (1.5 g./liter) in gelatin (34 g./liter) plus a small amount of saponin to improve spreading, and dried. Another sheet of paper was coated with a solution of 1-(p-sulfophenyl)-3-pentadecyl-5-pyrazolone (15 g./liter) plus gelatin (45 g./liter) plus formaldehyde and dried. A sheet of the first paper was exposed through a print on white paper to ultraviolet radiation. A sheet of the second paper was moistened with ammonia solution and pressed into contact with the exposed paper for 30 seconds. A sharply defined image of the print in red-brown dye was developed in the second paper.

When the transfer operation was repeated with a fresh receiving paper, another well defined azo dye image was obtained. It will be apparent that in our invention the coupling of the second or subsequently transferred diazonium salt images can be effected with the same or a different coupling component than used for coupling with the first transferred diazonium salt image. Thus, a multiplicity of images of different colors can be obtained from a single exposed diazonium salt-sensitized element.

*Example 3*

A gelatin solution (34 g. gelatin/liter) of the coupler (1-phenyl-3-(3′-(2′-(2‴, 4‴-diamyl-phenoxy)-5″-(2‴-sulfobenzoylamino) - benzoylamino) - benzoylamino)- 5-pyrazolone) was made by dispersing the coupler in a small quantity of sodium hydroxide and ethyl alcohol and adding this solution to the gelatin solution so as to obtain 5.7 g. of the coupler per liter. Saponin and formaldehyde were also added to the solution which was then coated on paper. A diazonium salt image was transferred from the exposed element of Example 2 to the paper which had been moistened with ammonia solution. The image which was formed on the paper was reddish-brown in color.

*Example 4*

A sheet of paper was wet with a concentrated solution of $Na_3PO_4 \cdot 12H_2O$ in water and, after drying, coated with a solution of 1-(p-sulfophenyl)-3-pentadecyl-5-pyrazolone (10 g./liter) plus gelatin (30 g./liter) plus formaldehyde and dried. A sheet of paper coated with diazotized 3-methyl-4-(N, N-diethylamino)-aniline was exposed through a print and put in contact with the first sheet under pressure at 130° C. for 5 seconds. A dye image was formed.

This example illustrates the use of a basic hydrated salt to supply both moisture and alkali for the promotion of coupling of the transferred diazonium salt image with the coupling component in the presence of heat. This process is essentially a dry process inasmuch as neither the exposed element nor the receiving sheet need be wetted to bring about the coupling reaction on the receiving sheet.

*Example 5*

Paper is coated with either a mixture of baryta and gelatin or gelatin alone at a rate of approximately 5 grams per square foot. The layer also contains chrome alum in a concentration of 2 parts to 100 parts of gelatin, dry weight.

The dye layer is impregnated with a solution of the following composition:

| | Parts |
|---|---|
| Diazo compound from diethyl amino-m-toluidine hydrochloride | 20 |
| Tartaric acid | 5 |
| Water | 100 |

and dried.

The paper is then exposed beneath a line positive at a distance of 18 inches from mercury vapor or arc illumination for an exposure of about 5 to 10 minutes and is then pressed into contact with moistened receptor paper.

This receptor paper is gelatin or gelatin-baryta coated and is impregnated with the following solution:

| | Parts |
|---|---|
| Phloroglucinol | 2 |
| Sodium carbonate (anh.) | 5 |
| Water | 100 |

After the exposed light-sensitive paper and the receptor paper have been in contact for one or two seconds, they are separated and an azo dye image is obtained in the receptor paper.

The coating weight of colloid on the receptor paper is not critical and, in fact, plain paper may be used, although the definition is less good than with a coated paper.

If desired, the sodium carbonate in the receptor paper of this example may be omitted and the azo dye formed by fuming the paper after contact with ammonia or applying an alkaline solution thereto.

In the above examples have been provided diffusible light-sensitive diazonium salts of aromatic amino compounds useful in our invention. Many other diffusible light-sensitive diazonium salts will occur to those skilled in the art such as the following:

Diazonium salts of:
- 2,5-dimethoxyaniline
- p,p'-diaminostilbene
- 3 - methyl - 4 - amino - N - ethyl - N - [β - (methylsulfonamido)-ethyl]-aniline
- 2-methoxy - 4 - amino - 5 - methyl - N,N-diethylaniline
- 4-amino-diphenylamine
- N-(4-aminophenyl)-piperidine
- 1,8 - dihydroxy - 2 - (p - aminophenylazo) - 3,6-disulfonaphthalene The coupling components useful in our invention are those well known in the art which react with a diazonium salt in the presence of alkali to form an azo dye. These coupling components include aromatic amines, phenols, and compounds containing a reactive methylene group which group may be a part of an open carbon chain or a carbocyclic or heterocyclic ring. The phenols and reactive methylene compounds are preferred because they possess high coupling rates under the conditions of the process. In the above examples have been provided both diffusible and substantially non-diffusing coupling components. The coupling components of Examples 2, 3 and 4 are representative of preferred coupling components which are substantially non-diffusing in the hydrophilic receiving sheet where they show little or no tendency for lateral diffusion in the receiving sheet in the presence of moisture and which show little or no tendency toward diffusing into the sheet containing the undecomposed diazonium salt image during transfer of the diazonium salt image to the receiving sheet. Other substantially non-diffusing coupling components which are useful in our invention are the following:

Coupling components:
- N-lauryl-p-aminophenol
- 4,5-di-sec. dodecyl catechol
- 5-pentadecyl resorcinol
- 1,2-di(2-hydroxy-3-naphthamido)-ethylene
- Polymeric coupling component obtained by reacting benzoylaceto-p-aminoanilide with a styrene-maleic anhydride interpolymer.

It will be apparent that the useful coupling components include phenols and naphthols, polyhydric phenols and naphthols; in the case of the phenols it being preferred that they contain a substituent such as an alkyl group of from about 5 to 20 carbon atoms or other high molecular weight group to prevent diffusion. Various compounds containing a reactive methylene group which couple with the diazonium salt are useful, and as in the case of the phenols it is desirable to use reactive methylene compounds having a long carbon chain or high molecular weight substituent in order to inhibit diffusion of the coupler component in the receiving sheet. These coupling components are exemplified by the polymeric coupling component in the above tabulation containing the group —CO—$CH_2$—CO— and by the high molecular weight pyrazolones of Examples 2, 3 and 4.

We claim:

1. A photographic reproduction process which comprises exposing to an illuminated subject a hydrophilic layer containing a diffusible diazonium salt to decompose the salt in the region of exposure, pressing the exposed layer into contact with a hydrophilic surface containing a basic hydrated salt and an azo dye coupling component while said layer and surface are substantially dry, heating the exposed layer and hydrophilic surface while in contact until moisture has been released from the hydrated salt, and the undecomposed diazonium salt has diffused imagewise to the hydrophilic surface and coupled with the coupling component to form a dye image on the hydrophilic surface.

2. The process of claim 1 wherein the basic hydrated salt is $Na_3PO_4 \cdot 12H_2O$.

3. The process of claim 1 wherein the coupling component is a non-diffusing azo dye coupling component.

References Cited in the file of this patent

UNITED STATES PATENTS

| | | |
|---|---|---|
| 1,917,370 | Hickman | July 11, 1933 |
| 2,289,714 | Land | July 14, 1942 |
| 2,596,756 | Yutzy et al. | May 13, 1952 |
| 2,600,996 | Land | June 17, 1952 |
| 2,634,677 | Klimkowski | Apr. 14, 1953 |

FOREIGN PATENTS

| | | |
|---|---|---|
| 451,190 | Great Britain | July 31, 1936 |